(12) United States Patent
Gada et al.

(10) Patent No.: US 10,410,543 B2
(45) Date of Patent: Sep. 10, 2019

(54) OPHTHALMIC TRAINING SIMULATOR

(71) Applicants: Satyen M. Gada, Washington, DC (US); Peter C. Liacouras, North Potomac, MD (US); Mark J. Wyn, Columbia, MD (US); Johnathan A. Garnes, Columbia, MD (US)

(72) Inventors: Satyen M. Gada, Washington, DC (US); Peter C. Liacouras, North Potomac, MD (US); Mark J. Wyn, Columbia, MD (US); Johnathan A. Garnes, Columbia, MD (US)

(73) Assignee: The United States of America as rep. by the Secretary of the Navy, Arlington, VA (US)

( * ) Notice: Subject to any disclaimer, the term of this patent is extended or adjusted under 35 U.S.C. 154(b) by 76 days.

(21) Appl. No.: 15/611,440

(22) Filed: Jun. 1, 2017

(65) Prior Publication Data
US 2018/0350269 A1    Dec. 6, 2018

(51) Int. Cl.
*G09B 23/28* (2006.01)
*G09B 23/34* (2006.01)
*G09B 9/00* (2006.01)
*G09B 23/32* (2006.01)

(52) U.S. Cl.
CPC .............. *G09B 23/34* (2013.01); *G09B 9/00* (2013.01); *G09B 23/32* (2013.01)

(58) Field of Classification Search
USPC .......................... 434/262, 267, 271
See application file for complete search history.

(56) References Cited

U.S. PATENT DOCUMENTS

| | | | | |
|---|---|---|---|---|
| 5,137,459 A * | 8/1992 | Zirm | ...................... | G09B 23/28 434/270 |
| 7,291,016 B2 * | 11/2007 | Otto | ...................... | G09B 23/28 434/270 |
| 7,896,653 B2 * | 3/2011 | Nylen | ...................... | G09B 23/34 434/271 |
| 8,157,568 B2 * | 4/2012 | Hara | ...................... | G09B 23/34 434/262 |
| 8,684,743 B2 * | 4/2014 | Van Dalen | ............. | G09B 23/30 434/267 |
| 8,821,166 B2 * | 9/2014 | Akura | ...................... | G09B 23/34 424/427 |
| 2014/0308644 A1* | 10/2014 | Wang | ...................... | G09B 23/30 434/271 |
| 2014/0356836 A1* | 12/2014 | Van Dalen | ........... | G09B 23/303 434/268 |
| 2015/0279238 A1* | 10/2015 | Forte | ...................... | G09B 7/02 434/271 |
| 2016/0098944 A1* | 4/2016 | Lin | ........................ | G09B 23/32 434/271 |

\* cited by examiner

*Primary Examiner* — Kurt Fernstrom
(74) *Attorney, Agent, or Firm* — Albert A. Churilla; Ning Yang; Diane Tso

(57) ABSTRACT

An ophthalmic training simulator with simulated foreign objects and/or canthal tendons. A method of practicing foreign object removal from the eye and lateral canthotomy of the eye using said ophthalmic training simulator.

17 Claims, 10 Drawing Sheets

OPHTHALMIC TRAINING SIMULATOR

FIELD OF INVENTION

Disclosed features concern medical training equipment and methods, and more particularly an ophthalmic training simulator, and methods of using said training simulator for teaching first responders and non-specialist physician basic procedures and techniques used in examining and treating an emergency eye trauma.

BACKGROUND

The eye is a small and complicated organ that is very delicate and sensitive on which to operate. The slightest error could permanently damage the eye, and result in impaired vision or even blindness. To avoid surgical mishaps, the development and honing of the necessary skills and expertise in performing medical procedure of the eye require hands on trainings, and practices in life-like settings. While ophthalmologists require years of comprehensive training of various surgical procedures, physicians in other specialties and first responders often need to respond to emergency eye trauma, and thus also need to learn how to perform basic emergency eye examination/treatment, and be familiarize with the use of specialized tools.

The training of emergency treatment of an eye trauma often involves hands on simulations, in which the doctors practice surgical procedures and techniques with the use of specialized equipment on a plastic eye or animal eye. Typically, a life-size replicate of a human head is provided to each trainee, which contains a cavity that mimics the contour, depth and features of a human eye socket. An animal or cadaver eye is placed inside this cavity and hold in place to prevent movement of the eyeball during practice. The eyeball can be pinned or sutured to the eye socket. While animal and cadaver eyeballs give a realistic feel of working with human tissue, a significant drawback is the lack of stability of eyeball during complex suturing exercises or training of other techniques that place significant pressure and torsion on the eye, and also limits its use with phacoemulsification machines. Alternatively, the animal or cadaver eye can be held in place by suction applied through a suction ring on a plastic base. A syringe plunger is connected to the suction ring and withdrawn to create the sufficient vacuum, which is maintained by clamping off the connected tubing. While the suction eye simulator is capable of holding an eyeball securely in place, the flat suction platform does not offers realistic eye movement during procedures. Animal or cadaver eyeball is also expensive and scarce, and hard to maintain, so they are often reserved for trainings of more complex ophthalmic procedures. Commercial training simulators, such as those disclosed in U.S. Pat. No. 7,291,016, US20150024364 and U.S. Pat. No. 8,845,334 supports hands on trainings of examination and treatment of eye. However, these simulators are often limited to bench top practices, and do not permit practice use of special equipment or tool, such as a slit lamp. Furthermore, neither a plastic eyeball nor an animal eyeball offers the close anatomical resemblance to a real human eyeball.

Thus, there still is a long-felt, yet unresolved need for an improved ophthalmic training simulator, and method for practicing emergency procedures and techniques related to examination and treatment of eye trauma. Moreover, there is a need in the art for a cost-efficient ophthalmology training simulator that supports repeat practices of emergency ophthalmic procedures and techniques under different simulation scenarios.

SUMMARY OF THE INVENTION

In view of the description above, there exists a need for an ophthalmic training simulator that provide doctors cost-efficient training opportunities under realistic conditions to practice emergency examination and treatment techniques of the eye, such foreign body removal procedures or lateral canthotomy.

A primary objective of the present invention is an improved ophthalmology training simulator.

Another objective of the present invention is to provide an improved means for practicing ocular foreign objects removal procedures and slit lamp examination.

Another objective of the present invention is to provide an improved means for practicing lateral canthotomy.

Still another objective of the present invention is to provide a cost-efficient ophthalmic training simulator for emergency eye treatment, which allows user to repeat common ophthalmic procedures that simulates different realistic scenarios of eye trauma.

According to the invention, an advantageous feature of the invention is the realistic and anatomically accurate reproduction of human face, eye and canthal tendon. Another advantageous feature of the invention is the ability to allow the practitioner to perform eye examination and procedures in a realistic environment with emphasis on slit lamp examination (i.e. observation of the eye under a slit lamp), removal of foreign objects from the eye and lateral canthotomy.

According to one aspect of the invention, the ophthalmic training simulator comprises a human sized prosthetic face base with one or more eye sockets (skull orbit), a silicone face mask with one eyelids, and one or two eye assembly, which is disposed under the face mask that overlays the face base. The eye assembly is firmly held inside the eye socket or skull orbit of the prosthetic face base. The post of the eye assembly may be coupled to a cavity inside the eye socket to prevent rotational movement of the eye assembly during practice procedure. In an embodiment, the prosthetic face base is made of hard plastic from three-dimensional (3-D) image of a human face captured by a camera, such as those captured by a digital stereophotogrammetry system. The prosthetic face base comprises all realistic three-dimensional features of a human face, include but not limited to a forehead, one or two eye sockets (skull orbit), a nose bridge and a chin. The eye socket or skull orbit is configured to firmly hold the eye assembly in place so that the front of the eyeball (opposable to the side of the post) in an orientation and depth to resemble the correct human eye anatomy. In another embodiment, additional skull orbit is created to provide spaces for manipulation of surgical tools. Holes can be drilled in prosthetic face base near the outside corner of each eye socket (i.e. orbital rim) to allow for canthal tendon attachments. Although the inventive ophthalmic training simulator replicates the size and contour of a real human face (front half of the head) for slit lamp attachment, only upper half of the simulator is needed for lateral canthotomy training. In one embodiment, the face mask is made of movie grade silicone using mold plates made by 3-D printing based on image capture of a real human face. The face mask is designed to overlay and tightly cover the prosthetic face base, which may comprise one or two eyelid. The face mask may be fastened or coupled to the prosthetic face base via any common methods, such as using pins, hinges, ties and glues. According to an embodiment, the removable eye assembly comprises a 3-D print of a human eyeball showing anatomically accurate details of at least the front features of a human eye, and a connecting post on the opposite side. The eyeball and post may be an integrated piece or two pieces affixed together. The eyeball is coated with material aimed to mimic human eye preferably gelatinous. Examples may include but not limited to clear silicone, silicone rubber, latex, gelatin, Neoprene or polychloroprene. The post of the removable eye assembly can be square in shape, matching square hole or cavity at the base of the eye socket. Once inserted, the post holds the eyeball in place during surgical practice against torsion preventing the eye assembly from rotational movement. Corners of the square post can be rounded slightly to increase the laxity and make the model more realistic with eye movements. In another embodiment, the eye assembly further comprises a flexible stalk such, as a coil spring, which is attached to the end of the post on one end and may be to a flat base on the other end. The flat base can aid attachment of the eye assembly to the eye socket. The spring simulates the actual movement of the human eyeball during ophthalmic training exercises. For example, once inserted into the eye socket, and covered by the face mask, the spring is compressed, and is released when lateral incision is made during practice lateral canthotomy procedure simulating the upward movement of the eyeball.

In yet another embodiment, foreign objects such as metal debris, wood chips, and glitters are glued to, dusted on or embedded onto the coated eyeball of the ophthalmic training simulator to allow slit lamp examination and practices of removal of foreign objects from the eye.

In yet another embodiment, the simulated canthal tendons were stitched through silicone face mask around the corner of upper and lower eyelid to simulate canthal tendons around orbital rim. Silicone tubes may be used on the back of the face mask to tighten and group the simulated canthal tendons.

Another aspect of this invention is a method to practice emergency procedures to examine and treat eye trauma using the inventive ophthalmologic simulator.

DETAILED DESCRIPTION OF THE INVENTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The title, headings, terms and phrases used herein are not intended to limit the subject matter or scope; but rather, to provide an understandable description of the invention.

Definitions:

The term eye socket or skull orbit, as used herein defined as the cavity of the skull in which the eye and its appendages are situated.

The terms including and/or having, as used herein, are defined as comprising open language).

The term human face topology as used herein is defined as 3-D anatomical features of a human face i.e. size, shape and contour of a human face.

FIGS. 1-9 depict operating embodiments of an ophthalmic training simulator according to the invention.

Figure 1:
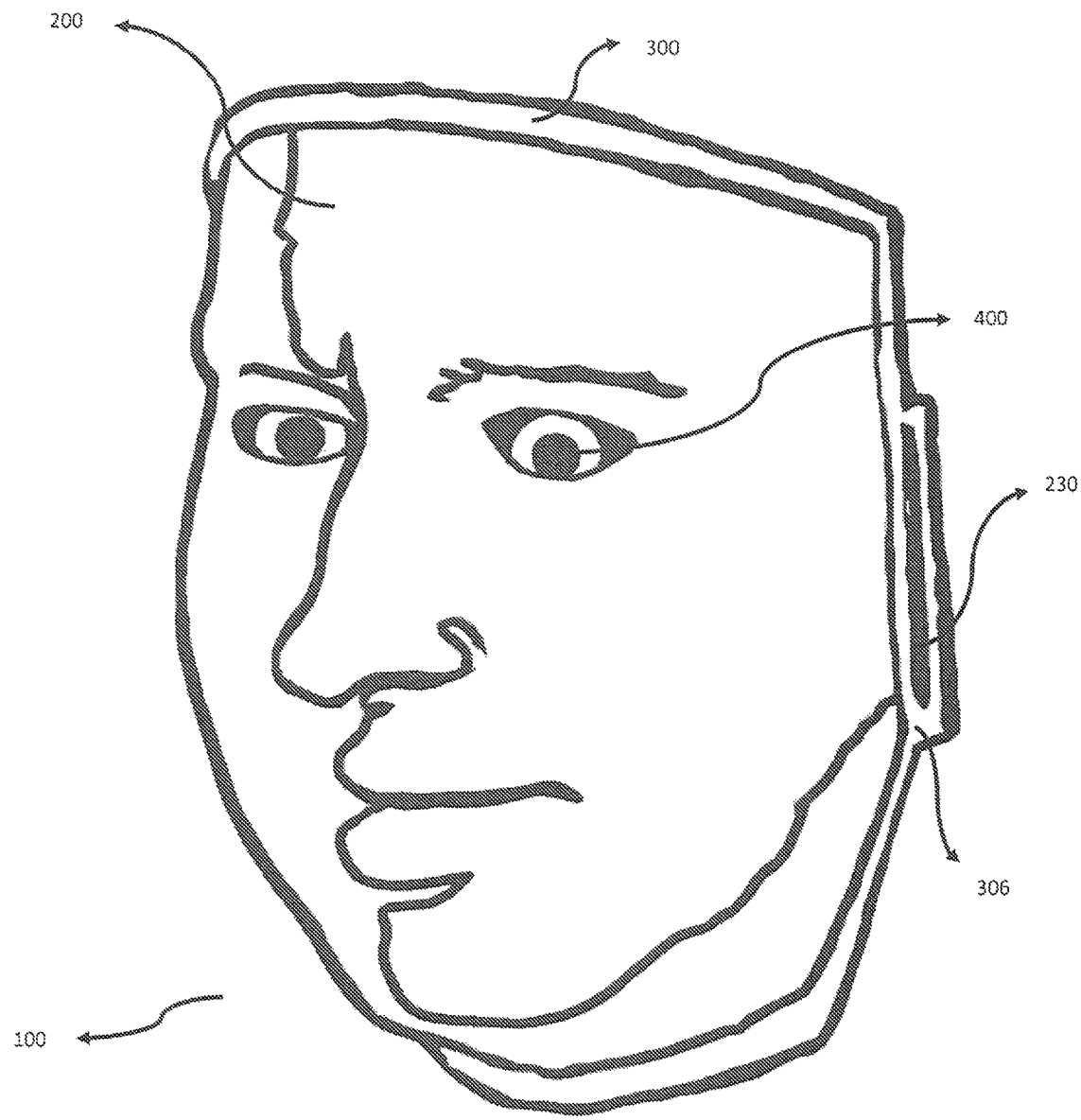
FIG. 1. An embodiment of a fully assembled ophthalmologic training simulator.
Figure 2:
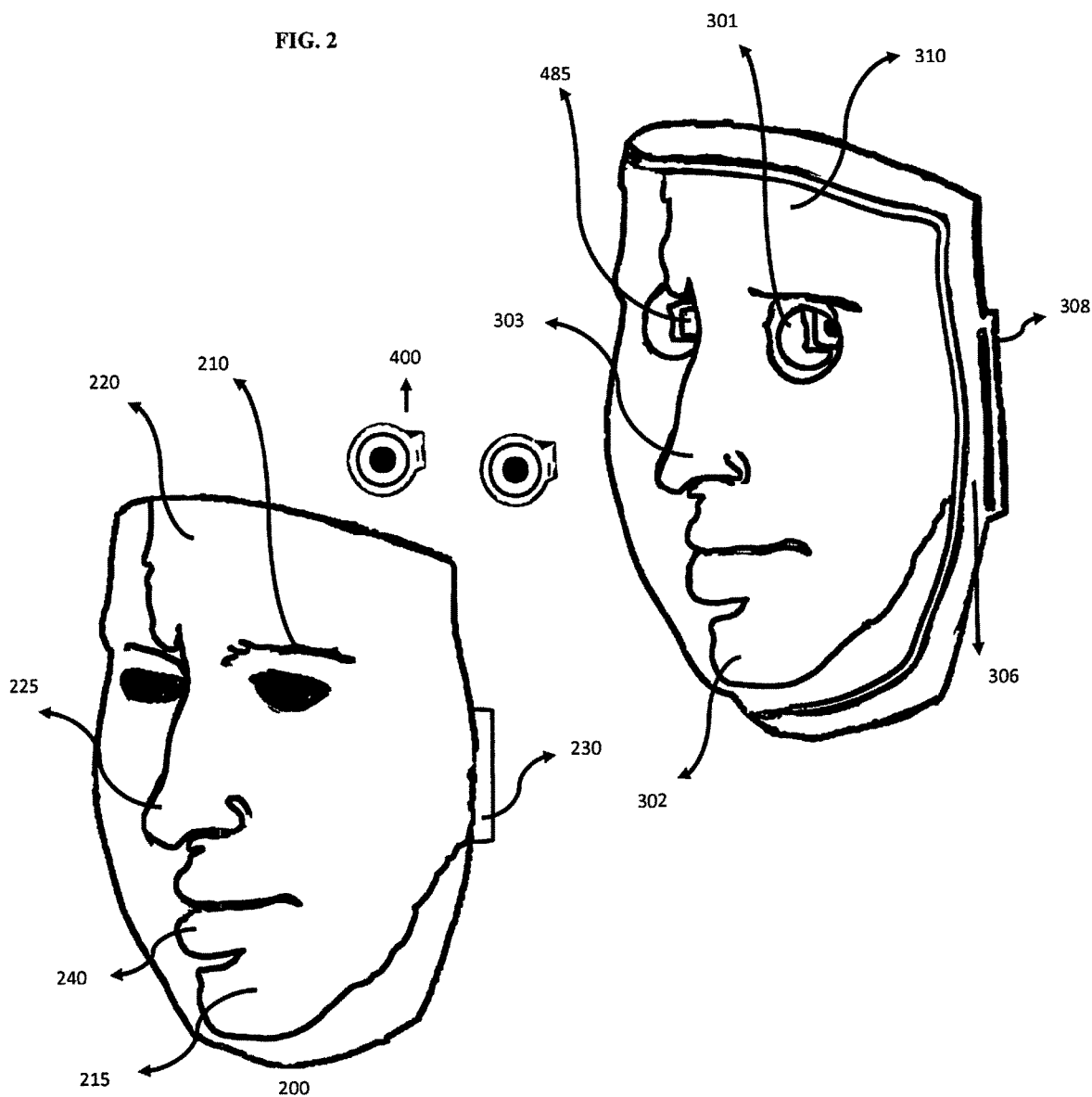
FIG. 2. A prospective view of the components of the inventive simulator.
Figure 3:
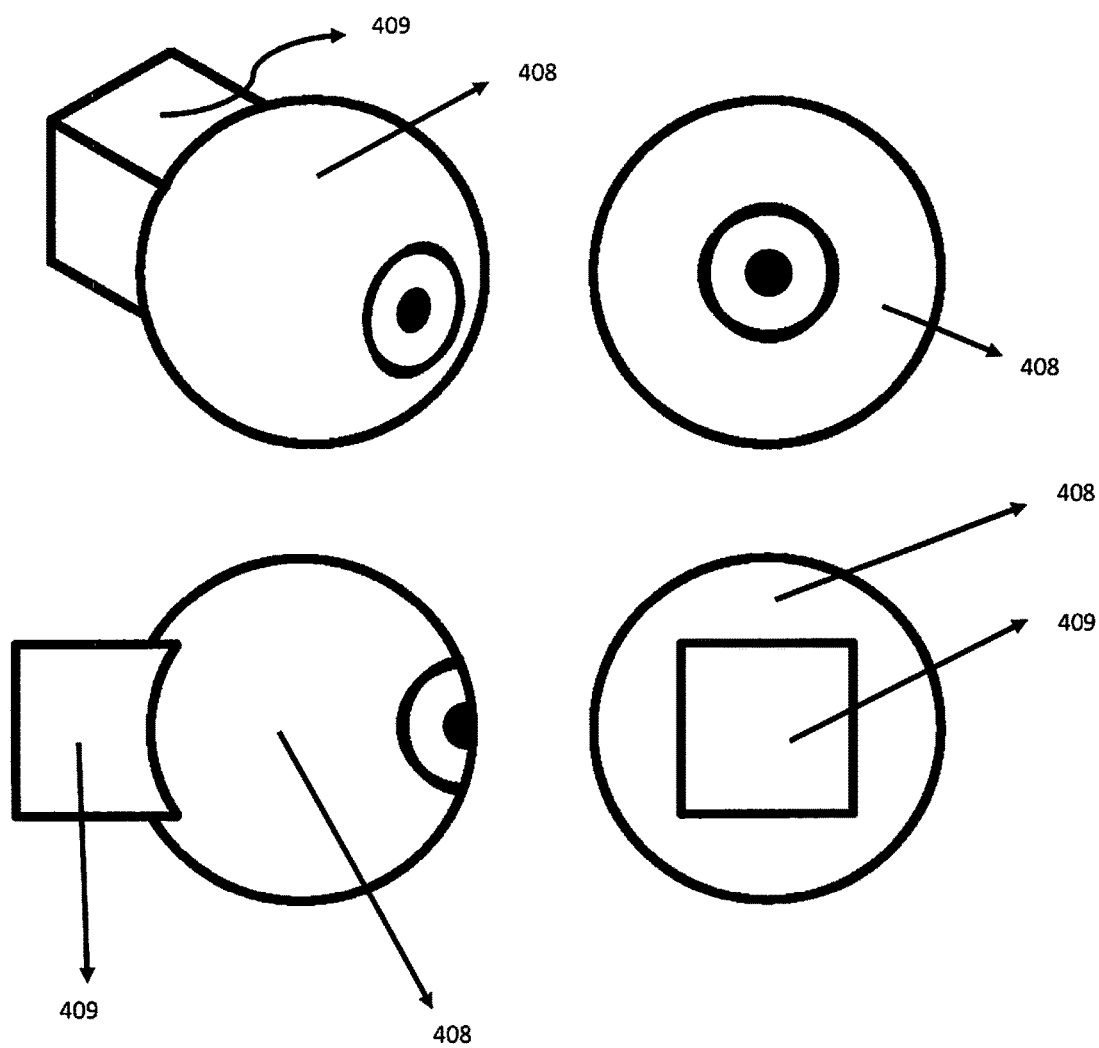
FIG. 3 A prospective view of the components the eye assembly.

As depicted in FIG. 2, the ophthalmic training simulator 100 comprises a prosthetic face base 300, a matching face mask 200 and an eye assembly 400. The prosthetic face base 300 is made to resemble human face topology, including 3-D anatomical features of a human face, including but not limited to one or two eye sockets 310, a forehead 301, a chin 302 and nose 303. The eye socket or skull orbit 310 is configured to hold an eye assembly 400 so that the front of the eyeball is displayed in the orientation and depth similar to that of a human eye, in a preferred embodiment, the prosthetic face base 300 is a 3-D print of a camera captured human face made of hard plastic. The face base can also be made via traditional manufacturing process such as milling or plastic extrusion using image captured by any scanning system, or made from a facial impression, etc.

However, it is understand that the prosthetic face base may be made of any other suitable material that is capable of providing base support to the ophthalmologic training simulator during ophthalmic training practices, such as being strapped to a slit lamp (see FIG. 4) or lay flat on a bench top. The suitable materials include but not limited to plaster, plastic, wood, metal, paper Mach, and Styrofoam etc.

A face mask 200 matching the anatomical contours of the prosthetic face base 300 is configured to be coupled to the prosthetic face base 300 and having one or more eyelid 210 that may partially covers the eye sockets 310. The face mask 200 may be made of any suitable material that are capable of simulating the appearance and the touch of human skin, including but not limited to latex, silicone, silicone rubber, gelatin, neoprene and polychloroprene etc. In the preferred embodiment, the face mask 200 is made of movie grade silicone via a 3D printing process. The face mask 200 may be painted, colored or coated to resemble the skin color and look of different human facial features, such as a forehead 225, a chin 220, lips 240, nose 215 and facial hair. The face mask 200 is mounted (i.e. overlay and tightly or tautly wrapped around) on the prosthetic face base 300 and coupled to it using any suitable affixation method, including but not limited to the use of a hinge, a pin, a clamp, stiches, a glue etc. In a preferred embodiment, a silicone face mask. 300 is coupled to the prosthetic face base 200, by inserting small tabs 230 on either side of the face mask into rectangular slots 306 on the sides of the prosthetic face base. A channel can also be created at the edge of the face base to accept ridge around the perimeter of the face mask. The face mask is coupled to the face base by pressing the ridges into the channel of the face base.

One or more removable eye assembly 400, having at least an artificial eyeball 408 and a post 409, is disposed inside the eye socket 310 of the face base, firmly held in place in the face base 300 by the post and covered partially by said openable eyelid of said face mask. The eyeball 408 simulates at least the front features of a human eyeball, including but not limited to conjunctiva, iris, lens, sclera, and cornea etc. In a preferred embodiment, the eyeball 408 is a 3D print of a human eye, at least part of the eyeball is colored, printed or coated to show the front features of a human eyeball, such as pupil, iris, sclera, cornea. The eyeball may be covered or coated with simulated cornea 430 using any suitable gelatinous material to resemble the texture of a human eye, such as clear silicone, latex, gelatin, neoprene and polychloroprene etc. The removable eye assembly 400 is placed inside and affixed to the eye socket 310 in an orientation to display the simulated front features of the eyeball. In one embodiment, the affixation is accomplished by inserting and the square post of the eye assembly 408 into a square slot or hole 485 inside the eye socket 310 of the face base 300. The post 409 extends from the back side (opposite side of the eyeball that displays features of a human eye) of the eye assembly. The match post 409 and slot/hole 485 functions in a tongue and groove fashion, locking the eye assembly in place, and prevent it from making any rotational movement during ophthalmic training exercises. The corners of the square post can be rounded slightly to increase the laxity and make the model more realistic with eye movements. Alternatively, a screw (i.e. function as the post) may extend from the back of the simulated eyeball, which may be inserted into a predrilled hole inside the eye socket with complementary threads such that the eyeball affixed onto the prosthetic face base 300. Other affixation and manipulation arrangements, all falling within the scope of this disclosure, may also be envisioned by skilled artisans.

Figure 8:
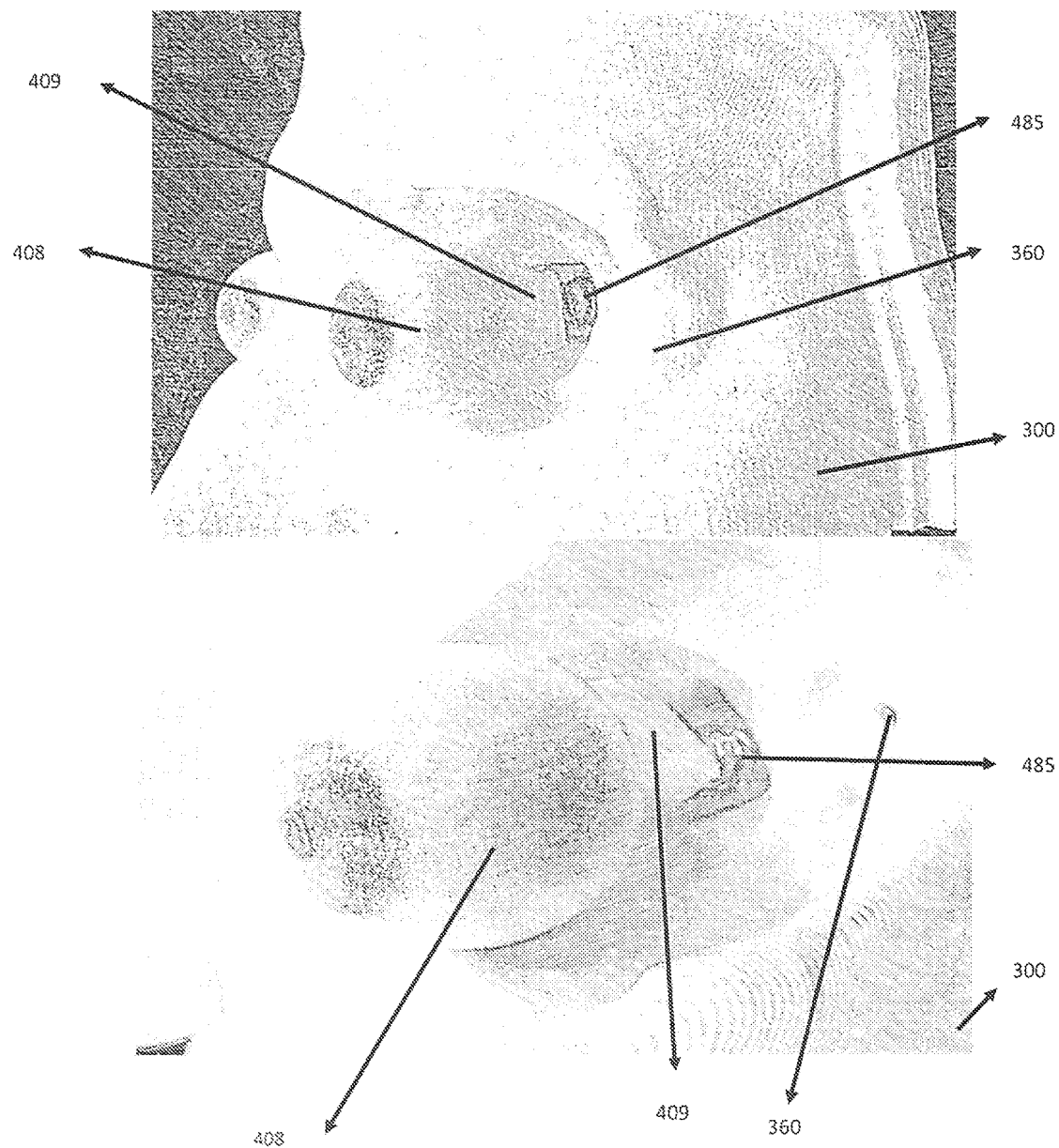
FIG. 8 A photograph showing an alternative embodiment of the ophthalmic training simulator for lateral canthotomy training including a prosthetic face base with enlarged eye socket with detailed anatomical landmarks or the orbital rims, the attached eye assembly with spring and hole for tendon attachment.
Figure 9:
FIG. 9 A photograph showing the fully assembled ophthalmic training simulator for lateral canthotomy training. Face mask is attached to the prosthetic face base via pins and eye assembly is covered and compressed by face mask.

Another embodiment of the inventive ophthalmic training simulator is used for lateral canthotomy training and shown in FIGS. 5-9. In this embodiment, the face base 300 and its matching face mask 200 may only resemble the top half of a human face (FIG. 9). During lateral canthotomy, the patient is normally not attached to a slit lamp, so the bottom half of the simulator is not needed. Preferably, the eye sockets 310 of the lateral canthotomy training simulator are slightly larger, and closely resemble the skull orbit of a human eye thus providing space for surgical tool manipulation (See FIG. 7). The face mask 200 of the canthotomy training simulator further comprises threads (or ribbons) 350 stitched through the face mask around orbital rim of the eye opening 370 to simulate canthal tendons 350. The simulated canthal tendon is preferably is at least 2 mm in breadth. In a prototype (see FIG. 5), Iodoform packing strips (gauze) of ¼ inch is used to simulate the canthal tendons. The simulated canthal tendons are threaded through the silicone face mask with a needle with one on top and one on the bottom to mimic the anatomy pattern of human canthal tendons. Small holes 360 are drilled on the back of the eye socket 310 of the face base 300, so the ends of the simulated canthal tendons 350 can go through and are tied together in the back of the face base. This further tightens the face mask to the face base. However, other materials that can mimic the elasticity and width of a human canthal tendon are also suitable for this application, such as nylon strips, ribbon, cotton band etc. A short silicon tube 365 may be used at the back of the face mask to group and tighten the simulated canthal tendons around the orbital rim and help to create the pattern of human lateral canthal tendons (The tendon is located just inferior and posterior to the lateral canthal fold) (see FIG. 5). Sponge/other silicone layers may be added to the face mask around the orbital rim to represent fat tissues.

Figure 6:
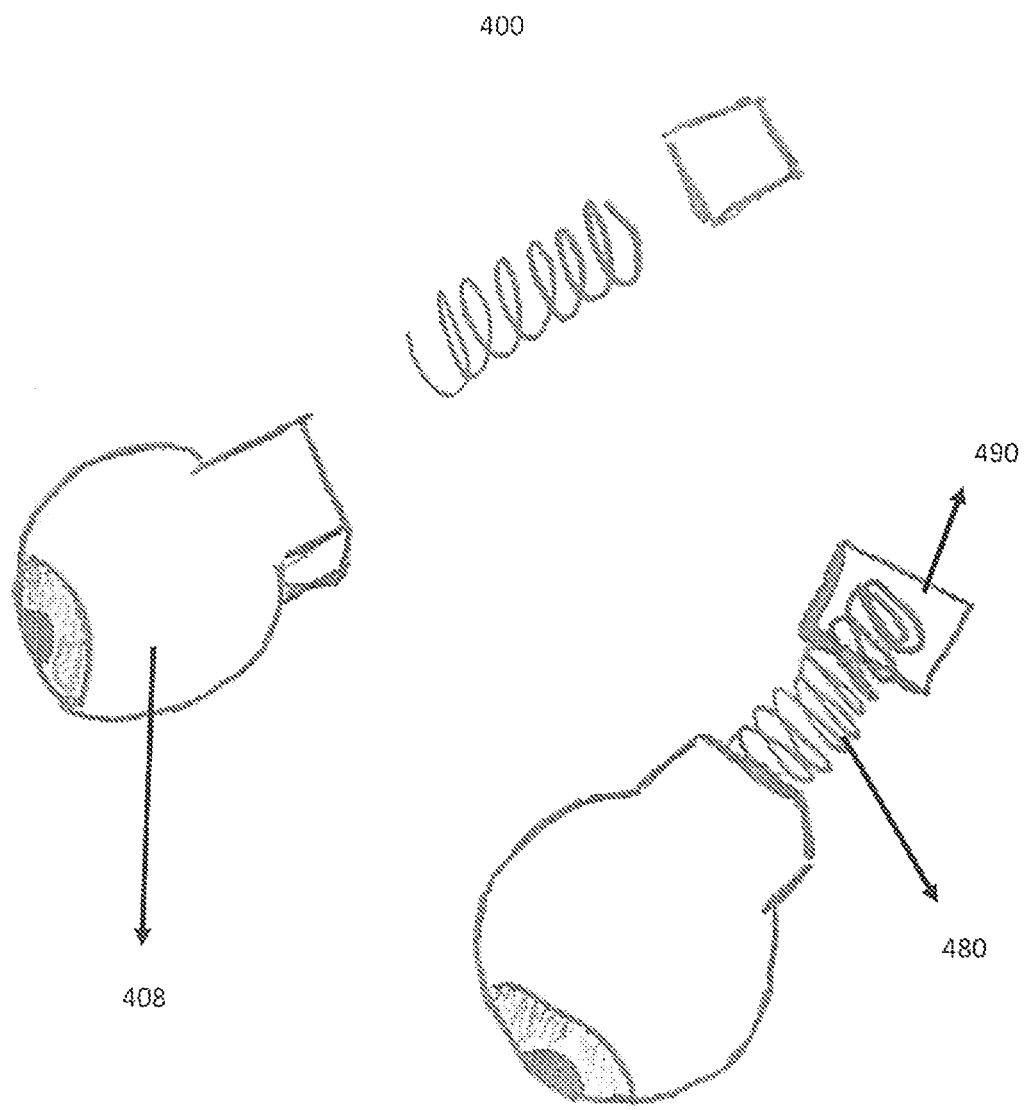
FIG. 6 A prospective view of an alternative embodiment of the eye assembly, showing the eye assembly with an eyeball, a post, a spring and a flat base.
Figure 7:
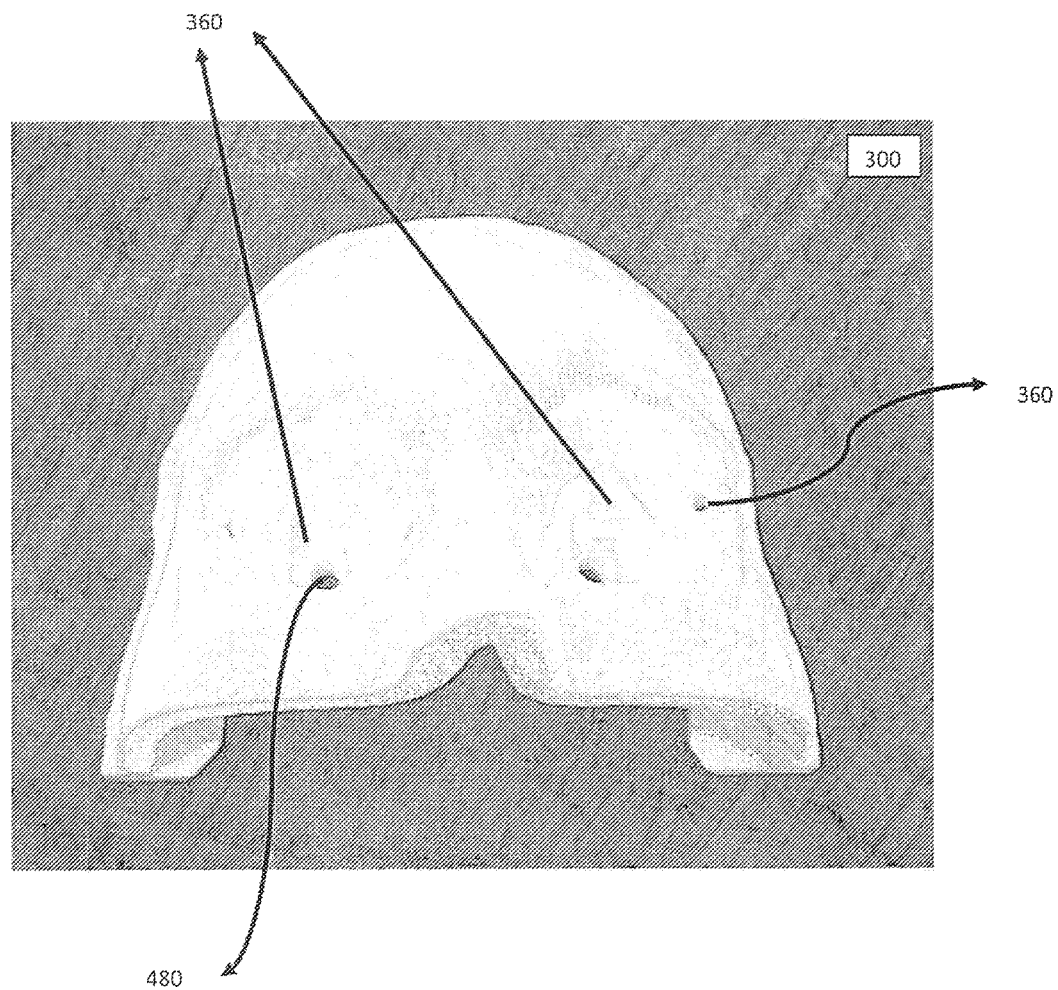
FIG. 7 A photograph showing an alternative embodiment of the prosthetic face base with larger skull orbit and holes for attaching simulated tendons.

As shown in FIG. 6 and FIG. 8, the eye assembly 400 of the inventive ophthalmic training simulator may further comprise flexible stalk, such as a coil spring 480, to simulate ocular motility. The flexible stalk can be attached to the end of the post 409 that is opposite to the eyeball 408 or between the eyeball and the post. When placed inside the eye socket 310 and affixed to the prosthetic face base 300, the flexible stalk 480 of the removable eye assembly 400 is compressed by the face mask, which can be further tightened to the face base by threading string or gauze through the face mask, then pulling the string or gauze threaded through the holes on the base and then tied or clamped behind the base. After transection of the canthal tendon during canthotomy procedure. The flexible stalk 480 extends, and the eye assembly 400 is released, simulating the forward movement of eyeball during a cantonmy. A base 490 may be affixed at the opposite end of the flexible stalk 480, allowing the eye assembly to be firmly attached to the prosthetic face base.

The inventive device may be used to practice a number of emergency ophthalmologic procedures. For example, an embodiment of the present invention is a method to practice removal of foreign objects from the eye using a slit lamp or lateral canthotomy.

Figure 4:
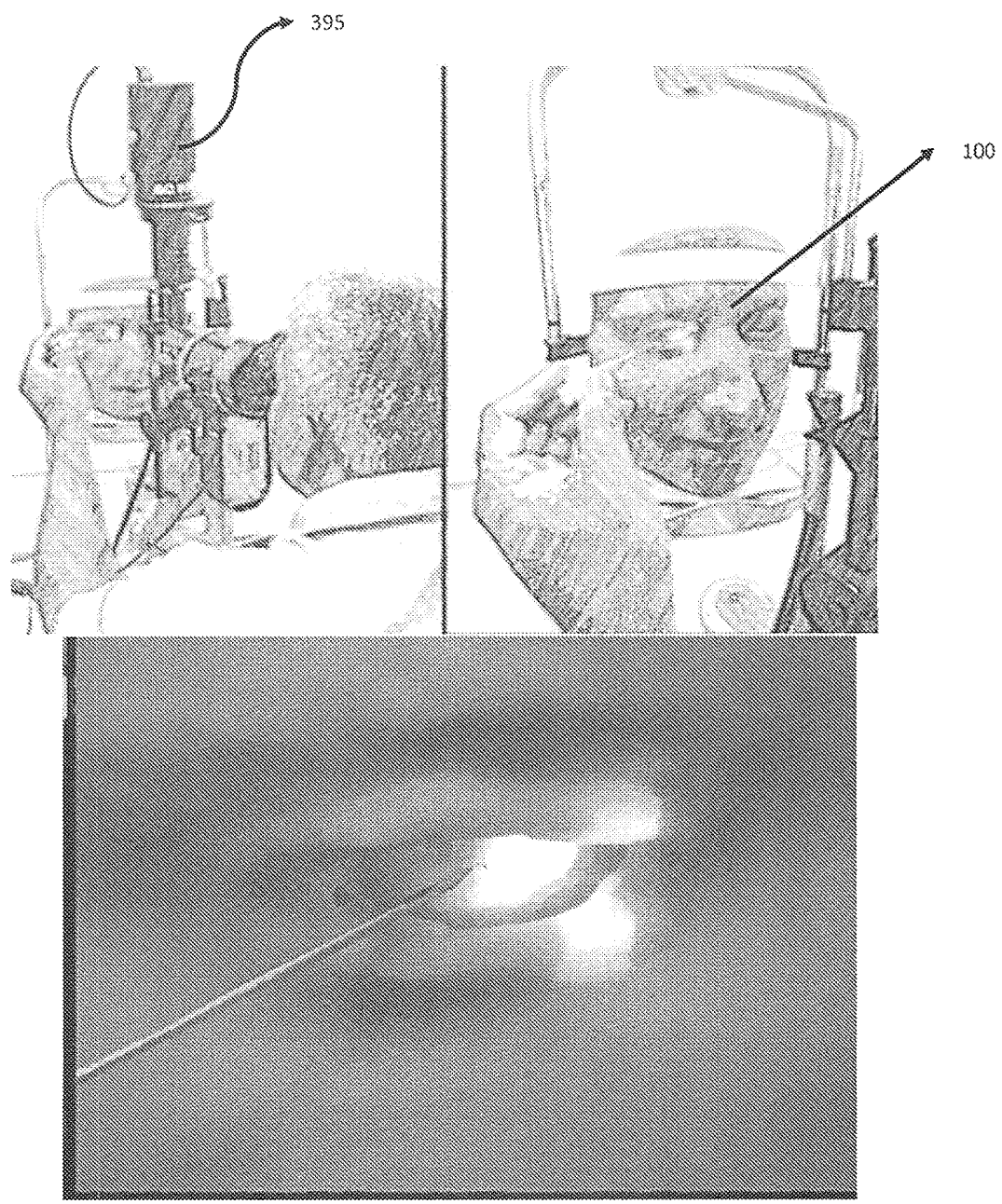
FIG. 4 A photograph showing a completely assembled ophthalmic training simulator attached to a slit lamp.
Figure 5:
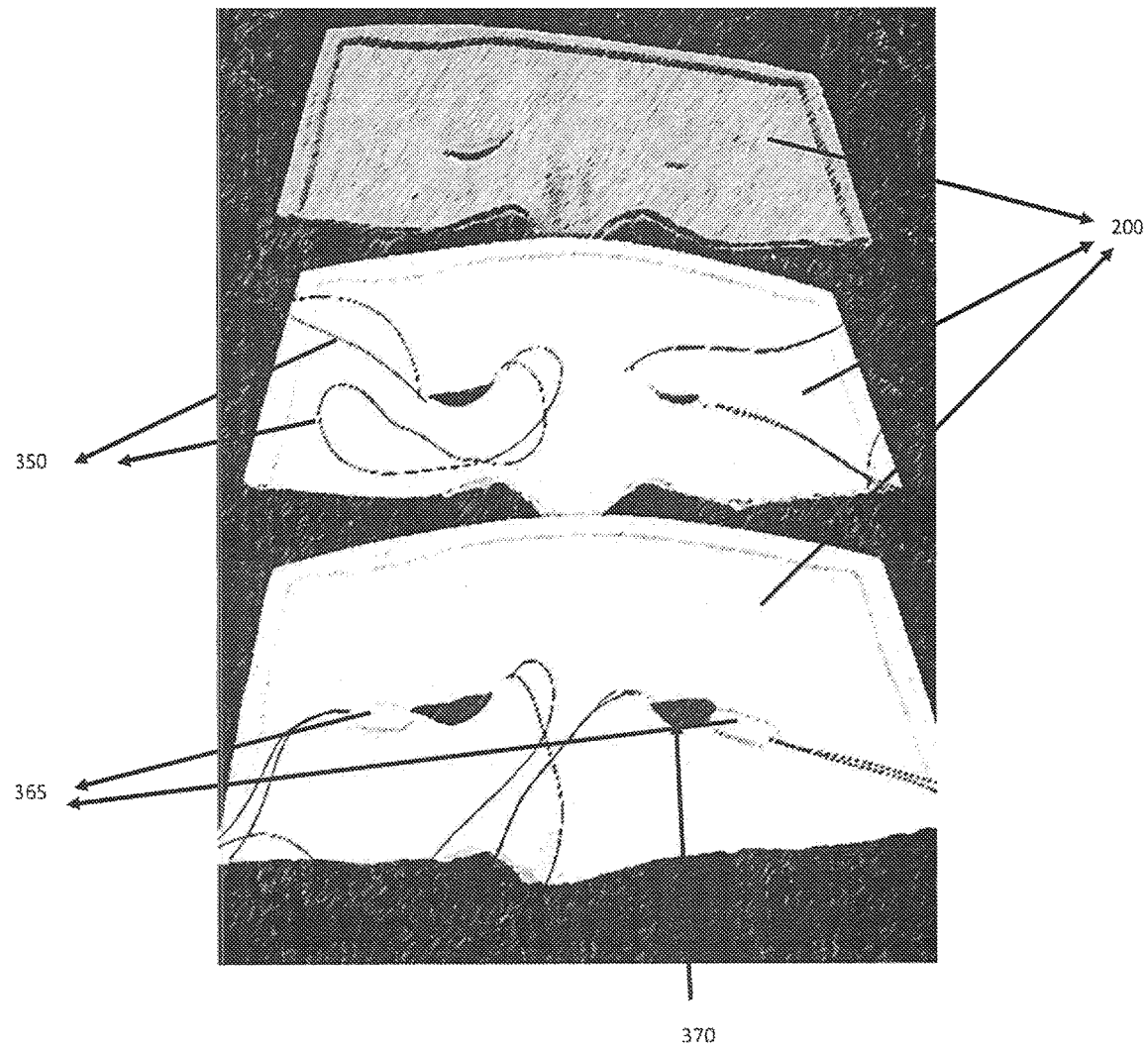
FIG. 5 A photograph of the back of the face mask showing threading of the simulated canthal tendons and a silicon tube.

Foreign Body Removal (See FIG. 4)

A corneal foreign body is an object (eg, metal, glass, wood, plastic, sand) either superficially adherent to or embedded in the cornea of the eye. The removal of a corneal foreign body is a procedure commonly performed in the clinic or emergency department setting. If corneal foreign bodies are not removed in a timely manner, they can cause prolonged pain and lead to complications such as infection and ocular necrosis.

One of the tools commonly used in this procedure is a slit lamp, which is a low-power microscope combined with a high-intensity light source that can be focused as a thin beam. Slit lamp examination is also called biomicroscopy, which allows the doctor to see a three-dimensional (3-D) view of the front of the eye, including the eyelids, conjunctiva, iris, lens, sclera, and cornea. The retina and optic nerve can also be seen under a slit lamp. In a slit lamp examination, the doctor can microscopically examine the eye for any abnormalities or problems, and preform simple ophthalmologic procedures, including the removal of foreign objects from the eye, such as a metal fragment, wood chips etc.

Before each training session, the eyeballs of the removable eye assembly is coated with a gelatinous material to simulate human cornea, and foreign objects such as metal debris or wood chips are then coated, dusted, embedded or glued onto the eyeball. An ophthalmic simulator of the present invention is then assembled. The removable eye assembly is disposed inside the eye socket, with the post inserted into the matching slot 485 on the face base inside the eye socket. The removable eye assembly is then coupled or affixed to the prosthetic face base. The face mask is placed as an overlay of the face base, and tightly or tightly wrapped around, and coupled to the face base. The fully assembled ophthalmic simulator is then attached to the slit lamp using a variety of suitable methods. In one embodiment, the assembled ophthalmic simulator is affixed to the slit lamp by tying Velcro straps across the forehead and chin of said ophthalmic simulator (see FIG. 4). Alternatively, the assembled ophthalmic simulator is affixed to the slit lamp, by the flanges 308 on the side of the simulator. The physician may then practice the removal of foreign objects from the eye using a slit lamp.

In a typical practice session of removing foreign objects from the inventive ophthalmic simulator, the doctor first applies a simulated anesthetic drip to the eyeball, followed by application of a simulated fluorescein dye which glows under special light. The doctor then use slit lamp to examine the eye for injuries, and try to locate the foreign objects. Once located, the doctor will remove the foreign objects use a moist cotton swab or try to flush it out using water. If initial techniques are unsuccessful, the doctors can practice removal of foreign objects using needles or other instruments. After each practice session, the ophthalmic simulator is disassembled. The gelatinous coating covering the eyeball is removed. A new coating and foreign objects may be applied to eyeball for the next training session.

Figure 10:
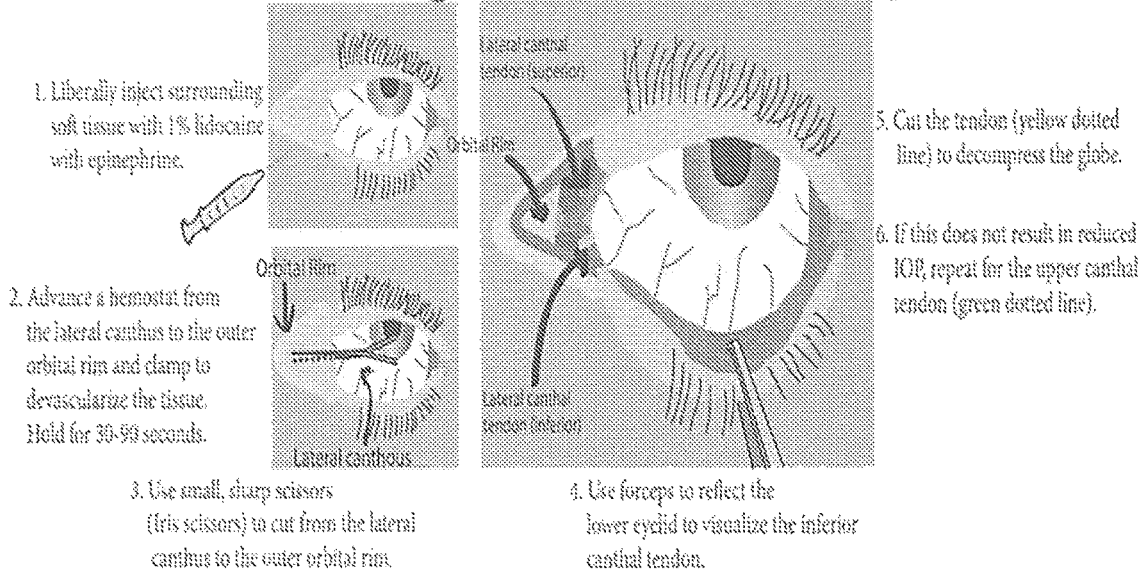
FIG. 10 A diagram showing the basic procedure for performing a lateral canthotomy and anatomy of human eye.

Lateral Canthotomy Training (See FIG. 10)

In preparing for canthotomy training session, simulated canthal tendons are stitched through the face mask around the orbital rim. The simulated lateral canthal tendons 350 may be grouped on the back of the face mask 200 using a short silicone tube 365 or simply tied to simulate the pattern of human canthal tendons. The tendon is located just inferior and posterior to the lateral canthal fold, as shown in FIG. 4. The ophthalmologic simulator is then assembled by inserting and coupling the removable eye assembly to the face base 300, with the post 409 and the attached flexible stalk 480 inserted into the slot 485 inside the eye socket. The face mask is then overlay on top and coupled to the face base. The loose ends of the simulated canthal tendon is threaded through the holes 360 inside the eye socket of the face base and tied at the back, thus affixing the tendon to the face base. The face mask is then coupled (secured) to the face base, producing a fully assembled ophthalmic training simulator for lateral canthotomy practices.

In a typical canthotomy training session, the doctor first cleans the skin around the eye using a simulated chlorhexidine solution. The doctor then injects the simulated local anesthetic from the lateral canthus to the orbital rim, directing the needle tip away from the eyeball. The eye is irrigated with saline to clear any debris. A straight mosquito hemostat is slided along the lateral canthus, with one prong against the orbit, and the other superficial to the skin. Compress the tissue for 1 minute to minimize bleeding. Along this same path, cut all layers of tissue with the iris scissors. Grasp the lower eyelid with forceps and retract it to reveal the lateral canthal tendon. Cut completely through the middle of the lateral canthal ligament with the iris scissors. The procedure steps of canthotomy may vary based on the physician.

What is claimed is:

1. An ophthalmic training simulator comprising:
   a) a prosthetic face base having an eye socket;
   b) a face mask having an openable eyelid, and configured to overlay and be coupled to said prosthetic face base; and
   c) a removable eye assembly having an eyeball, and a connecting post;
      wherein said eye assembly is disposed inside said eye socket of the face base, firmly held in place by the post and covered partially by said openable eyelid of said face mask.

2. The ophthalmic training simulator of claim 1, wherein said prosthetic face base is made of plastic, Papier-mâché, plaster, metal, wood or Styrofoam.

3. The ophthalmic training simulator of claim 1, wherein said prosthetic face base is configured to be coupled with a biomicroscope.

4. The ophthalmic training simulator of claim 1, wherein said prosthetic face base is configured to resemble human face topology.

5. The ophthalmic training simulator of claim 1, wherein said eye socket has a cavity configured to receive the post of the eye assembly and to prevent rotational movement of the said eye assembly.

6. The ophthalmic training simulator of claim 1, wherein said face mask is made of a material selected from the group consisting of gelatin, silicone rubber, silicone, latex, silicon, neoprene and polychloroprene.

7. The ophthalmic training simulator of claim 1, wherein the eyeball further comprises a gelatinous material that simulates the anatomy of a human eye ball, said gelatinous material being embedded or coated with at least one foreign body.

8. The ophthalmic training simulator of claim 7, wherein said eyeball is coated with a gelatinous material.

9. The ophthalmic training simulator of claim 1, wherein said eyeball further comprises a flexible stalk connected to the post of said eye assembly to simulate ocular movement of the eyeball.

10. The ophthalmic training simulator of claim 9, wherein said flexible stalk is a coil spring.

11. The ophthalmic training simulator of claim 1, wherein said face mask further comprises of at least one simulated canthal tendon.

12. The ophthalmic training simulator of claim 11, wherein said simulated canthal tendon is stitched through the face mask around orbital rim in a pattern to simulate superior and inferior lateral canthal tendons.

13. The ophthalmic training simulator of claim 12, wherein said simulated canthal tendon is attached to the face base.

14. A method of practicing foreign body removal from an eye using ophthalmic simulator of claim 1, comprising:
   a) providing a removable eye assembly comprising said eyeball coated with a gelatinous material that simulates the anatomy of a human eyeball, said gelatinous material being embedded or coated with at least one foreign body;
   b) assembling said ophthalmic training simulator;
   c) mounting said ophthalmic training simulator onto a biomicroscope;
   d) viewing said ophthalmic training simulator through said biomicroscope; and
   e) removing said at least one foreign body from said removable eye assembly with one or more removal implements.

15. The method of claim 14, wherein assembling said ophthalmic training simulator comprises:
   a) placing said eyeball within the eye socket and affixing it to the face base;
   b) covering said face base with said face mask so that the eyelid partially cover said eye ball; and
   c) coupling said face mask to said face base.

16. The method of practicing lateral canthotomy of the eye using ophthalmic training simulator of claim 1 comprises:
   a) producing a face mask with at least one simulated canthal tendon;
   b) assembling said ophthalmic training simulator; and
   c) practicing lateral canthotomy on said ophthalmic training simulator.

17. The method of claim 16, wherein said assembling said ophthalmic training simulator comprises:
   a) placing said artificial eyeball within the eye socket and affixing it to the face base;
   b) covering said face base with said face mask so that the eyelid partially cover said eye ball;
   c) coupling said face mask to said face base; and
   d) affixing simulated canthal tendons to said face base.

* * * * *